United States Patent [19]

Bobka

[11] 4,030,751

[45] June 21, 1977

[54] PORTABLE TRAILER DUMP BED

[75] Inventor: George R. Bobka, Sarasota, Fla.

[73] Assignee: The Raymond Lee Organization, Inc., New York, N.Y.

[22] Filed: Jan. 5, 1976

[21] Appl. No.: 646,617

[52] U.S. Cl. .............................. 298/1 A; 214/82; 222/405; 298/17 R; 298/22 R

[51] Int. Cl.² .......................................... B60P 1/16

[58] Field of Search ......... 298/1 B, 1 R, 1 A, 22 D, 298/22 R, 17 R; 214/310, 82; 222/405

[56] References Cited

UNITED STATES PATENTS

| 2,684,864 | 7/1954 | Anthony | 298/1 A X |
| 3,871,706 | 3/1975 | Odom | 298/1 A |

Primary Examiner—L. J. Paperner
Assistant Examiner—George F. Abraham
Attorney, Agent, or Firm—Howard I. Podell

[57] ABSTRACT

A portable trailer equipped with a rotatable bed plate hinged to the rear of the trailer and normally located within the confines of the trailer sides with a telescopic hydraulic cylinder mounted to the underside of the front of the bed plate and to the trailer frame so as to elevate the bed plate for dumping the contents of the bed. A gasket is mounted along the side and front edges of the bed plate so as to prevent material on the bed plate from falling off the side and front edges of the bed plate.

2 Claims, 3 Drawing Figures

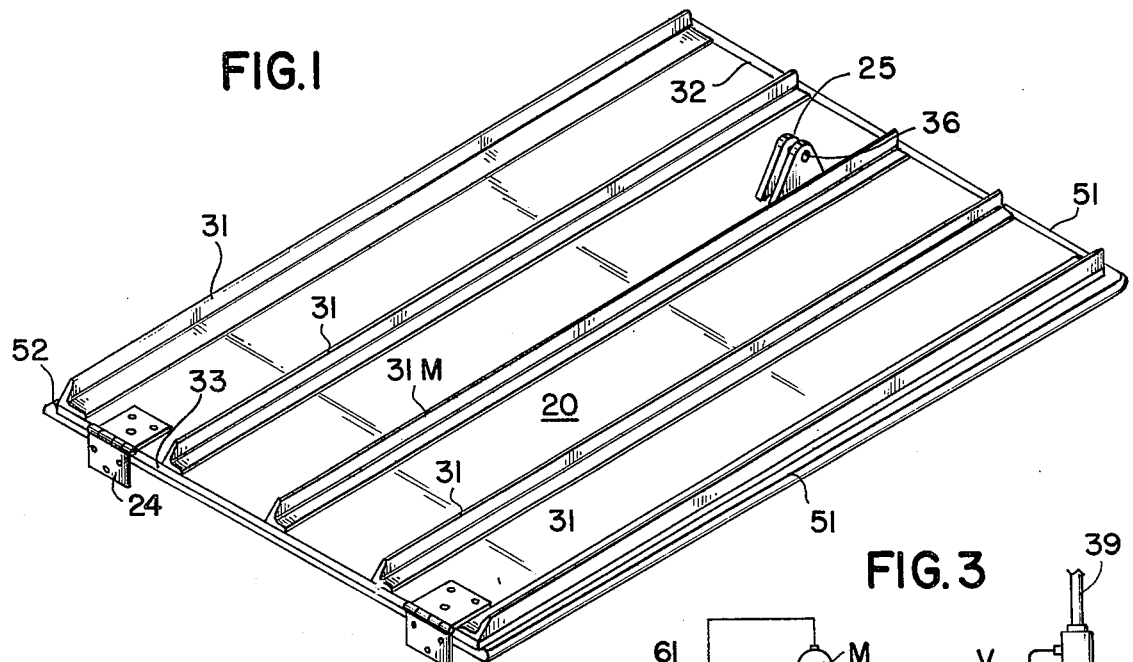
FIG. 1
FIG. 3
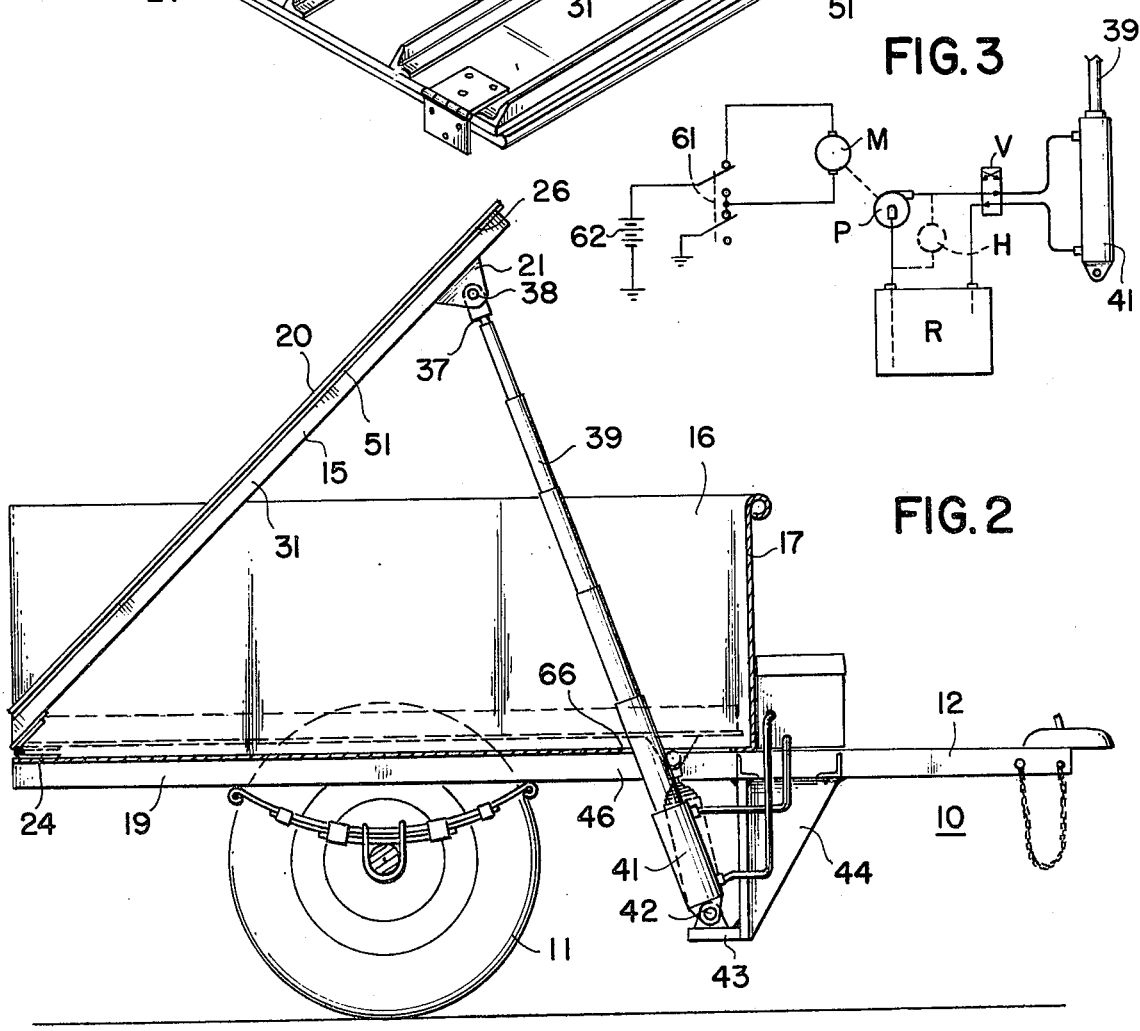
FIG. 2

PORTABLE TRAILER DUMP BED

SUMMARY OF THE INVENTION

My invention is a portable trailer equipped with a rotatable bed plate hinged to the rear of the trailer and normally located within the confines of the trailer sides with a telescopic hydraulic cylinder mounted to the underside of the front of the bed plate and to the trailer frame so as to elevate the bed plate for dumping the contents of the bed. A gasket is mounted along the side and front edges of the bed plate so as to prevent material on the bed plate from falling off the side and front edges of the bed plate.

BRIEF DESCRIPTION OF THE DRAWINGS

The objects and features of the invention may be understood with reference to the following detailed description of an illustrative embodiment of the invention, taken together with the accompanying drawings in which:

FIG. 1 is a bottom perspective view of the bed plate;

FIG. 2 is a side view of the invention; and

FIG. 3 is a schematic diagram of the electrical and hydraulic circuitry.

DESCRIPTION OF THE PREFERRED EMBODIMENT

Turning now descriptively to the drawings, in which similar reference characters denote similar elements throughout the several views, FIG. 2 illustrates a portable trailer 10, the frame 46 of which is mounted on a pair of wheels 11 and fitted with a conventional towing hitch assembly 12, in which the attachable dumpable bed plate assembly 15 is mounted.

Trailer 10 is formed of a base frame 46 fitted with a floor plate 19 joined to a pair of fixed vertical sides 16 and a forward vertical end side 17, and may be equipped with a rear door (not shown), hinged to the floor plate 19 or sides 16.

A dump bed plate 20 is mounted at its rear end 33 to hinges 24 attached to the rear of the floor plate 19. Hydraulic powered mechanism serves to elevate the front section 26 of the bed plate 20 so as to slide any load on bed plate 20 out of the rear of the equipped trailer 10.

Bed plate 20 is reinforced on its underside by a plurality of spaced metal angle bars 31 extending from the forward end 32 to the rear end 33 of the plate 20. A bracket 25 is fastened to a mid angle bar 31M proximate to front edge 35 with bracket 25 formed with a pivot hole 36.

The piston 37 of an extensible hydraulic cylinder 39 is joined by a pivot pin 38 to bracket 25, with the cylinder shell 41 similarly mounted by a pivot pin 42 to a bracket 43 mounted to a support brace 44 fixed to the underside of the base frame 46 of the trailer.

A gasket 51 formed of resilient flexible sheet material is fixed to both side edges 52 and front edge 32 of the underside of plate 20 to extend beyond the side edges 52 and front edge 32 to bear against the trailer sides 16 and front end side 17 respectively when the bed plate 20 is resting parallel to the floor plate 19. Gasket 51 serves to prevent loose material on bed plate 20 from sliding off of the front end side and sides of the trailer, both when the bed plate is in the horizontal position and while it is being elevated.

FIG. 3 illustrates the hydraulic and electrical circuitry with a reversible pump motor M controlled by a double pole reversing switch 61 connected to a battery 62. Motor M drives pump P to pump hydraulic fluid from reservoir R through a three-way reversing valve V to telescopic hydraulic cylinder 39. A hand pump H may be optionally connected in the hydraulic circuit parallel to the motor driven pump P as shown by dash lines.

The dump bed plate 20 and associated hydraulic equipment may be readily removed from or installed in a trailer. Hydraulic cylinder 39 extends through a hole 66 in floor plate 19, which hole may be readily plugged when the cylinder and plate is removed.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A cargo vehicle formed with an open box structure formed of a floor plate joined to a forward and to opposed side walls, which box structure is fixed to the vehicle, together with a removable dump bed plate, the rear end of which is detachably jointed by a hinge to the rear of the floor plate of the said box structure, said dump bed plate of a size to extend between the side walls of the open box structure, with hydraulic means detachably mounted to the underside of the forward section of the dump bed plate and to the vehicle for elevation of the forward end of said plate so as to pivot said plate about said hinge, with the forward edge and the side edges of said plate fitted with gasket material that contacts the fixed front and side walls of the box structure when the dump bed plate is in the retracted position and during elevation of the dump bed plate.

2. The combination as recited in claim 1 in which the vehicle is a portable trailer.

* * * * *